United States Patent
Dawson et al.

[15] 3,676,425
[45] July 11, 1972

[54] PROCESS FOR THE SEPARATION OF HMX FROM MIXTURES COMPRISING RDX AND HMX

[72] Inventors: Ralph E. Dawson; Donald M. Mahaffey, both of Kingsport, Tenn.

[73] Assignee: The United States of America as represented by the Secretary of the Army

[22] Filed: Oct. 6, 1970

[21] Appl. No.: 78,607

[52] U.S. Cl. ................................260/239 HM, 260/248 NS
[51] Int. Cl. .....................................C07d 55/16, C07d 55/60
[58] Field of Search ..............................260/239 HM, 248 NS

[56] References Cited

UNITED STATES PATENTS

| | | | |
|---|---|---|---|
| 2,900,381 | 8/1959 | Thatcher | 260/239 |
| 3,297,681 | 1/1967 | Wright et al. | 260/239 |
| 3,304,300 | 2/1967 | Watters | 260/239 |

OTHER PUBLICATIONS

George et al., Chem. Abstracts, Vol. 63, Cols. 9107–9108 (1965).

Selig, Chem. Abstracts, Vol. 62, Col. 16,251 (1965).

*Primary Examiner*—Alton D. Rollins
*Attorney*—Cecil D. Quillen, Jr. and Daniel B. Reece, III

[57] ABSTRACT

A process for the separation of HMX (cyclotetramethylenetetranitramine) from mixtures of RDX (cyclotrimethylenetrinitramine) and HMX whereby said mixtures are dissolved in hot, water-saturated cyclopentanone and the RDX and HMX are thereafter selectively precipitated.

12 Claims, No Drawings

PROCESS FOR THE SEPARATION OF HMX FROM MIXTURES COMPRISING RDX AND HMX

This invention relates to the recovery of the small quantities of cyclotetramethylenetetranitramine, hereinafter referred to as HMX, which are present in the output of the manufacturing process utilized to produce cyclotrimethylenetrinitramine, hereinafter referred to as RDX.

During the manufacture of RDX via the Bachmann process, one embodiment of which is characterized by Canadian Pat. No. 590,851, HMX is produced as a by-product. The concentration of HMX in the RDX is usually about 3 to 13 percent by weight although the HMX concentration will vary with variations in the manufacturing conditions. Separation of HMX from RDX is difficult because of the very similar physical and chemical properties of the two compounds. Solubility, for example, of RDX and HMX in common solvents, i.e., cyclohexanone, acetone, butyl acetate, toluene, etc., is in the range of 0.1 to 0.7 grams per 100 ml. of solution at 30° C. The median particle size of the RDX and HMX in the output of the manufacturing process is very similar, usually in the range of about 40-60 microns. Thus, there is insufficient difference between the particle sizes to permit separation utilizing conventional methods. Likewise, the density of RDX is about 1.8 grams per cc. compared with about 1.9 grams per cc. for the beta form of HMX.

When manufactured by processes adjusted to give a predominant yield of HMX the cost of the resulting HMX is considerably higher than the cost of HMX manufactured as a by-product with RDX. Thus, from an economical standpoint, it is desirable to separate the HMX from the RDX to the maximum extent feasible. Also, HMX has several polymorphic crystalline forms which have drastically different impact sensitivities. Therefore, it is imperative that the HMX be either recovered in the least sensitive, i.e., the beta polymorph, or subsequently converted to such form.

Surprisingly, it has been found that HMX in admixture with RDX may be dissolved in certain organic ketones and when so dissolved HMX will form a complex with the ketone which is stable for a limited period of time, the time being sufficient to permit separation of the RDX from the solution prior to the break-down of the HMX ketone complex.

Therefore, an object of this invention is to provide a process which permits economical separation of HMX from RDX and HMX manufacturing mixtures.

A further object is to provide a process for the recovery of RDX from an HMX—RDX admixture in a particle size suitable for sale without the necessity of additional crystallization operations.

A still further object of the invention is to provide a process for the recovery of HMX from an HMX—RDX admixture in its least sensitive polymorphic crystalline form.

Other objects and advantages will become apparent as the invention is hereinafter more particularly described.

In a preferred embodiment of this invention, sufficient water is mixed with cyclopentanone to produce a 2-phase system consisting of water and a water-cyclopentanone azeotrope. At 100° C., the boiling point of the azeotrope, the azeotrope will contain approximately 20 percent water.

The RDX and HMX mixture, normally comprising 5-15 percent HMX with the remainder RDX, is added to the water-cyclopentanone azeotrope and heated until complete solution is obtained. As will be appreciated, the temperature utilized is purely a matter of choice. However, the higher the temperature, up to the boiling point of the azeotrope, the more of the RDX/HMX mixture that can be dissolved in a given quantity of solvent, consequently, the higher the yield obtained from the resulting precipitates. Therefore, the most advantageous operation of the process appears to occur when the upper temperature is just below the boiling point of the water-cyclopentanone azeotrope and sufficient RDX/HMX is added to produce a saturated solution. Thus, the preferred range of temperature is between 70° C. and 100° C., preferably between 90° C. and 100° C. The solution is then cooled to ambient temperature. It has been found that if the cooling is permitted to take much longer than about thirty minutes the purity of the RDX is impaired as the HMX begins to precipitate with the RDX. It has further been found that when the cooling to room temperature is accomplished in from 5 to 20 minutes, preferably 9 to 15 minutes, that the particle size of the precipitated RDX will be in the range of 60-150 microns and will be suitable for sale without the necessity of additional crystallization operations. Once the solution has reached ambient temperature, the precipitate, consisting essentially of high purity RDX, is separated from the solution using conventional solid-liquid separation techniques, e.g., filtration. The solution is then permitted to stand for a minimum of one hour during which time a second precipitate forms. This second precipitate comprises HMX crystals in the least sensitive polymorphic form.

This second precipitate is separated from the solution, again using conventional techniques. There remains in the cyclopentanone azeotrope a quantity of RDX and HMX. This remaining dissolved material may be removed from the cyclopentanone azeotrope by distillation which will leave a residue of RDX and HMX in water or the cyclopentanone-water azeotrope containing dissolved materials may be recycled. The effective yield of subsequent cycles will be somewhat improved in that the recycled feed solution is already essentially saturated with the HMX/RDX mixture at room temperature.

Although the mechanism of the invention is not completely understood it is believed that cyclopentanone forms a complex with the HMX. It is further believed that the condition of complete water saturation is not necessary to the functioning of the invention but that optimum results are obtained when a fully saturated water-cyclopentanone azeotrope is utilized.

The surprising efficiency of this invention will be better understood and appreciated by reference to the following examples.

EXAMPLE 1

Forty grams of a 90/10 RDX/HMX mixture is added to 187 grams of cyclopentanone saturated with water. The mixture is heated to 95° C. and agitated for 10 minutes. Thereafter, the solution is cooled in 15 minutes with agitation to an ambient temperature of 20°-25° C. The solution is vacuum filtered through a fritted-glass 20-micron filter. The recovered solids are dried, weighed and analyzed to determine RDX purity. The solids weigh 22.7 g. and are 99+percent pure RDX.

The filtrate is then allowed to stand unagitated for approximately one hour during which time a second precipitate will form. This second precipitate is removed by filtering, with vacuum, through a 20-micron fritted glass filter. The solids recovered weigh 2.4 g. with an 88 percent HMX purity. The filtrate is distilled at 100° C. leaving a water solids mixture. These solids are removed by filtration as above and dried and weighed. The recovered solids weigh 14.9 g. and are 87.9% RDX and 12.1% HMX.

Analysis of these results show that 63 percent of the RDX present is recovered in the first precipitate and that 53 percent of the HMX present is recovered in the second precipitate.

EXAMPLE 2

The procedure of Example 1 is followed except that the water-saturated cyclopentanone used is the filtrate remaining from a replicate of Example 1 after the removal of the second precipitate. In this example, the first precipitate, when separated, dried and weighed is found to consist of 34.9 g. with a 98 percent purity of RDX. The second precipitate is found to consist of 3.7 g. and 80 percent purity of HMX.

Both results further document the surprising selectivity with which the RDX is contained in the first precipitate and HMX in the second precipitate. In both instances, the particle size of the RDX is in the 60 to 150 micron range, which is suitable for commercial sale without further processing and the HMX is present in the beta polymorphic form which is the form least sensitive to impact.

Although the invention has been described and illustrated in considerable detail with reference to a certain preferred embodiment, it will be understood that variations and modifications can be effected within the spirit and scope of the invention.

We claim:

1. A process for separating RDX and HMX from mixtures comprising RDX and HMX which comprises:
   a. dissolving the RDX/HMX mixture in a solvent comprising a water-cyclopentanone solution heated to a temperature less than the boiling point of said solution;
   b. cooling the water-cyclopentanone, RDX/HMX solution until a first precipitate, comprising RDX, forms;
   c. separating said first precipitate from the solution;
   d. allowing the remaining solution to set until a second precipitate, comprising HMX, forms; and
   e. thereafter separating said second precipitate from the solution.

2. The process of claim 1 wherein the dissolving of the RDX/HMX mixture in the solvent is accomplished at about 95° C. to about 100° C.

3. The process of claim 1 wherein the solvent consists essentially of cyclopentanone saturated with water.

4. The process of claim 1 wherein the solution remaining after the separation of the second precipitate is recycled for use as the solvent in the processing of additional RDX/HMX mixture.

5. The process of claim 1 wherein the mixture of RDX and HMX comprises at least 5% HMX by weight.

6. The process of claim 1 wherein the RDX/HMX solution is cooled to about 20° to 25° C. to form the first precipitate.

7. The process of claim 6 wherein said cooling is accomplished in from about 5 to about 20 minutes.

8. The process of claim 6 wherein said cooling is accomplished in from about 9 to about 15 minutes.

9. The process of claim 1 wherein separation of the first precipitate is accomplished by filtration.

10. The process of claim 1 wherein the separation of the second precipitate is accomplished by filtration.

11. The process of claim 1 wherein the particle size of the first precipitate, comprising RDX, is in the range of about 60 microns to about 150 microns.

12. The process of claim 1 wherein the HMX recovered in the second precipitate is in its least sensitive polymorphic crystalline form.

* * * * *